Dec. 30, 1924.
W. N. BOOTH
1,521,071
DEMOUNTABLE RIM FOR VEHICLE WHEELS
Filed Sept. 10, 1920    2 Sheets-Sheet 2
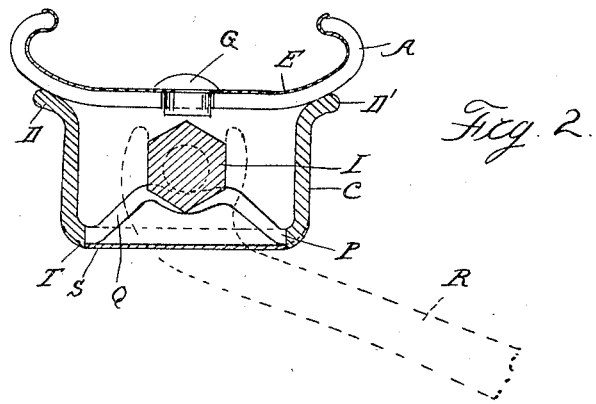
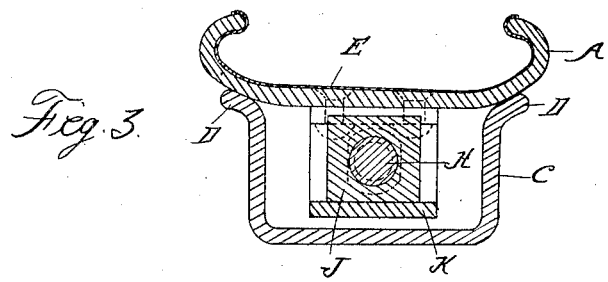
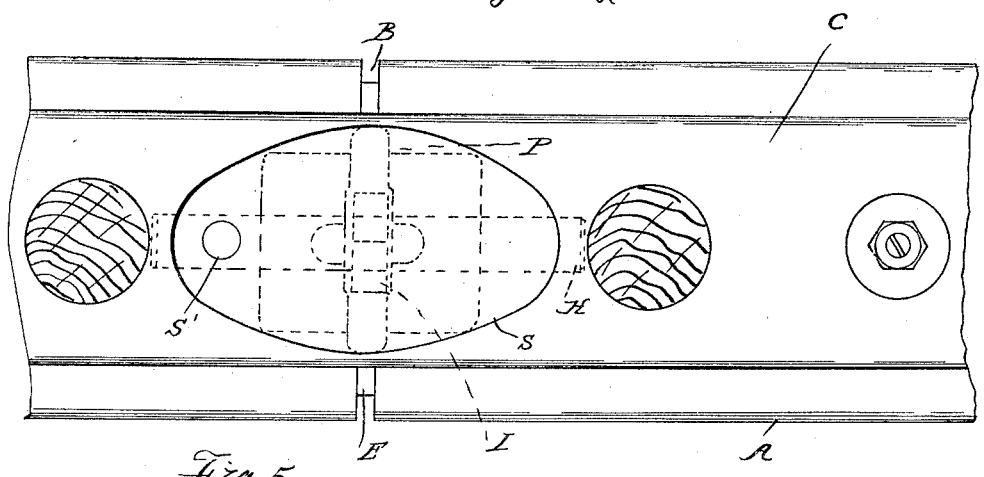
Inventor
William N. Booth Patented Dec. 30, 1924.

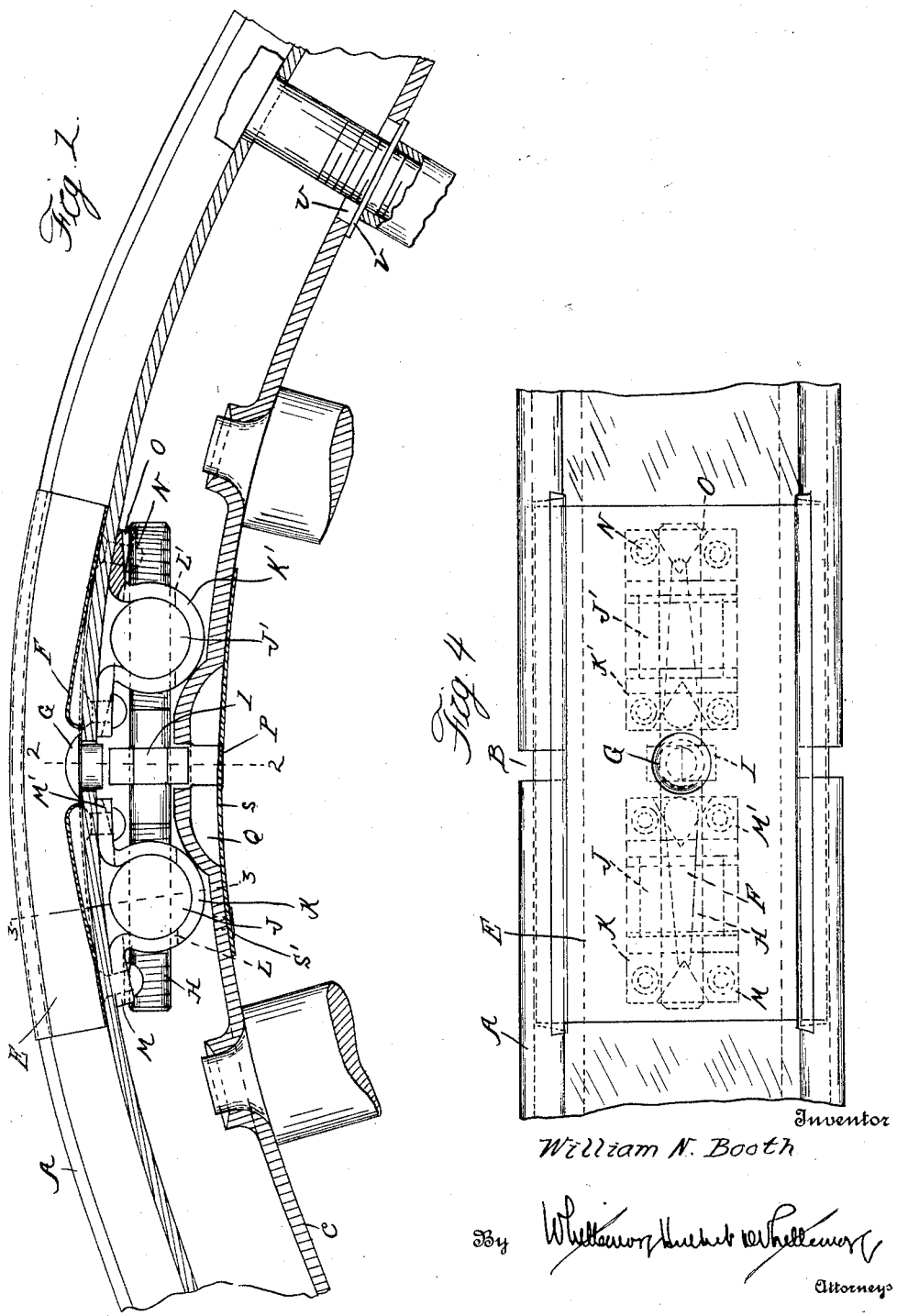

1,521,071

UNITED STATES PATENT OFFICE.

WILLIAM N. BOOTH, OF DETROIT, MICHIGAN.

DEMOUNTABLE RIM FOR VEHICLE WHEELS.

Application filed September 10, 1920. Serial No. 409,294.

*To all whom it may concern:*

Be it known that I, WILLIAM N. BOOTH, a citizen of the United States of America, residing at Detroit, in the county of Wayne and State of Michigan, have invented certain new and useful Improvements in Demountable Rims for Vehicle Wheels, of which the following is a specification, reference being had therein to the accompanying drawings.

The invention relates to demountable rims of that type designed for use with soft beaded tires, or what is commonly known as clincher tires, and it is the object of the invention to provide a simple construction of means for expanding and contracting the rim circumferentially, for the purpose of engaging or disengaging the same from the wheel felly. To this end the invention consists in the construction as hereinafter set forth.

In the drawings:

Figure 1 is a section in the central plane of a wheel and through the felly and the demountable rim mounted thereon;

Figure 2 is a transverse section on line 2—2 of Figure 1;

Figure 3 is a similar section on line 3—3 of Figure 1;

Figure 4 is a plan view of a portion of the demountable rim and felly;

Figure 5 is a plan view of the plate as attached to the wheel.

Heretofore demountable rims have been made which are circumferentially expansible for the purpose of engagement with the felly. These prior constructions have, however, been complex in construction and expensive to manufacture, so as to preclude their use upon the cheaper grades of motor vehicles. The present invention accomplishes the result by an exceedingly simple construction and one which may be applied to any standard make of clincher rim and co-operating felly.

In detail, A is the clincher rim of standard construction, which is transversely split at B. C is a metallic wheel felly of channel-shape cross section and provided on its opposite sides with the symmetrical annular inclined or flared flanges D and D' forming seats for the rim.

To permit of circumferentially expanding the rim while the tire is in engagement therewith and is inflated, it is necessary to bridge across the split in all positions of adjustment. For this purpose I have provided a member E conforming to the cross-sectional and longitudinal contour of the rim and of sufficient length to overlap the opposite ends thereof when circumferentially expanded. This member E is preferably formed of light gage sheet-metal and preferably a non-corrodible material, such, for instance, as brass. To strengthen the bridge, there are preferably provided longitudinally extending beads F pressed therein, and to hold the bridge central with respect to the ends of the rim, there is a lug or pin G engaging corresponding notches in the ends of the rim.

The means for forcibly expanding the rim comprises a screw-threaded member H, preferably having its opposite end portions provided with right and left hand threads respectively. I is a polygonal portion at the center of the member H for engagement with an operating wrench. J and J' are nut members engaging the threaded portions of the member H and secured to the opposite ends of the split rim.

It is necessary to provide a pivotal connection between the nuts J J' and the rim, to permit of angular movement when the rim is expanded. It is also essential that this connection should be mechanically strong as it must expand the rim against the pressure of the inflated tire in engagement therewith and must also lock the rim in firm engagement with the felly. With my improved construction these results are accomplished; first, by forming the nut as a cylinder having its axis transverse to the member H; and second, by engaging the cylindrical nuts with straps K and K' embracing the same and riveted, or otherwise secured, to the rim. As shown, the straps K and K' may be formed of pressed sheet metal having a cylindrical portion embracing and fitting the cylindrical nut, and having opposite apertures L and L' therein for the passage of the threaded portion of the member H, said apertures being elongated to provide clearance during angular movement. The straps K are further provided with out-turned flanges M and M', which are punched for the passage of rivets N, and between the rivets there is preferably cut out a gore O to provide further clearance for the member H.

To permit of turning the member H, the web portion of the felly C is transversely slotted at P for the insertion of an operating wrench and the portions of the web on opposite sides of the slot are struck in, as indicated at Q, to provide end thrust bearings against the polygonal portion I. Thus the portion I not only forms a means of turning the member H, but also a thrust bearing for transmitting the torque from the felly to the rim.

In manufacturing the construction as described the rim A before it is split is punched for engagement with the rivets N and the pin G and is subsequently transversely sawed or otherwise severed in the plane of the aperture for the pin. The aperture for the pin G as originally punched is therefore slightly elongated to compensate for the metal removed by the severing. The straps K and K', which are formed up in ties, are then riveted to the opposite ends of the rim, the cylindrical nuts J are inserted end-wise into said straps, and the member H engaged therewith by rotation. When thus assembled, the tire may be engaged while the rim is contracted in diameter and either before or after inflation thereof, the rim is circumferentially expanded by rotating the member H until it is of sufficient size to pass over the flanges D and D' of the felly. The polygonal portion I is then placed in engagement with the slot P and after the rim is in engagement with the felly, it may be contracted by rotating the member H in the opposite direction. This rotation is accomplished by a wrench, indicated in dotted lines at R, which is inserted through the slot P into engagement with the polygonal portion I. The angular movement permitted is sufficient for the engagement of the wrench with successive polygonal faces, so that the rim may be tightly clamped upon the annular inclined or flared seats formed by the flanges D and D'. As the contraction is circumferential, the rim will be automatically aligned with the felly and held from lateral displacement. Also, the engagement of the polygonal portion I with the shoulders Q will hold the rim from creeping upon the felly.

To prevent the mud and water from entering the slot in the felly through which the tool is inserted for expanding and contracting the rim, I preferably provide a closure plate therefor. This closure may be conveniently used as a marking for a name plate for the wheel and also for instructions as to operation of the demountable rim. As shown, S is the closure plate fashioned to conform to the curve of the felly and pivotally attached at S' thereto. Upon the face of this plate is stamped, or otherwise marked, the name of the manufacturer and such instructions as are deemed necessary for the operation of the demounting means. The plate is held from accidental disengagement by lugs or shoulders and these are preferably formed by portions T at the ends of the transverse slot P, which are struck outward slightly beyond the surface to which the plate is attached. Thus to open the plate for insertion of a tool, it must be sprung slightly away from the felly so as to pass over one of the projections T.

When the rim is expanded or contracted, the tire inflation tube will be moved relative to the felly, so that the latter must be slotted to provide clearance for this movement. This slot U is normally closed by a plate V, which is sleeved upon the inflation tube and is held in position by the screw cap.

As thus far described and as shown, the transversely split rim is of normal size when in contracted position and the clincher tire may be engaged therewith in the usual way of springing the soft beads into the locking flanges of the rim. If desired, however, the rim may be of a size when contracted to permit of slipping the tire beads over the flanges and may then be expanded to its normal size. Such a construction could also be used with tires having non-elastic beads, as well as with tires of the clincher type.

What I claim as my invention is:

1. The combination with a transversely split rim, of means for circumferentially expanding or contracting said rim, comprising a threaded tie member connected to said rim near one of its ends, a nut of cylindrical form having its axis transverse to said tie member, and a strap for engaging said nut secured to said rim near the other of its ends.

2. The combination with a transversely split rim, of a member connected to one end of said rim having a threaded portion, a nut engaging said threaded portion of cylindrical form and having its axis transverse to the axis of said member, and a strap for embracing said cylindrical nut secured to the other end of the rim.

3. The combination with a transversely split rim, of connecting means between the opposite ends of said rim, comprising a centrally arranged rotary member connected to one end of said rim and having a threaded portion, a nut engaging said threaded portion in the form of a cylinder having its axis transverse to the axis of said threaded portion, a strap for embracing said nut cut away for the passage of said threaded portion and providing clearance for a limited angular movement thereof, and means for securing said strap to the other end of the rim.

4. The combination with a transversely split rim, of connecting means between the opposite ends of said rim, comprising a rotary member having right and left threaded portions at opposite ends thereof, nuts for engaging said threaded portions of cylindrical form with their axes transverse to that of said rotary member, straps embracing said cylindrical nuts and cut away for the passage of said rotary member with a clearance permitting a limited angular movement thereof, and means for securing said straps to the opposite ends of the rim.

5. The combination with a transversely split rim, of means for expanding and contracting said rim, comprising a rotary member having right and left threaded portions at opposite ends thereof, nuts for engaging said threaded portions of external cylindrical form and having their axes transverse to the axis of said rotary member, straps for embracing said nuts cut away on opposite sides for the passage of said rotary member and providing clearance for a limited angular movement thereof, and means for securing said straps to the opposite ends of said rim.

6. In a wheel, the combination with a hollow felly, of a transversely split demountable rim for seating upon said felly, and means for circumferentially expanding and contracting said rim located within said hollow felly, comprising a longitudinally-extending rotary member having threaded end portions, nuts for engaging said threaded end portions externally of cylindrical form with their axes transverse to that of said rotary member, and straps embracing said nuts cut away to provide clearance for said rotary member and provided with means for securing the same to the opposite ends of the split rim, said hollow felly being apertured for the insertion of a tool to rotate said rotary member.

7. In a wheel, the combination with a hollow felly provided with symmetrically arranged flanges forming a seat for a demountable rim, of a transversely split demountable rim for engaging said seat, means for circumferentially expanding and contracting said rim, comprising a longitudinally-extending rotary member having threaded end portions, nuts for engaging said threaded end portions of external cylindrical form with their axes transverse to said rotary member, straps for embracing said nuts cut away for the passage of said rotary member and providing clearance for a limited angular adjustment thereof, an enlargement at the center of said rotary member adapted for the engagement of a tool therewith, said hollow felly being slotted for engagement with said enlargement and for the insertion of the tool into operative relation thereto.

8. In a wheel, the combination with a metallic felly of outwardly opening channel form and having symmetrical flaring flanges at opposite sides thereof, forming a rim seat, a transversely split demountable rim, means secured to said rim and located within said hollow felly for circumferentially expanding and contracting the rim, and means upon said felly for engaging said rim expanding and contracting means to drive said rim from said felly.

9. In a wheel, the combination with a hollow metallic felly of outwardly opening channel section and provided with symmetrically arranged flaring flanges on opposite sides thereof forming a rim seat, of a transversely split demountable rim, and means for circumferentially expanding and contracting said rim, comprising a rotary member extending across the split and having threaded end portions and a central enlargement, nuts for engaging said threaded end portions, means for pivotally connecting said nuts with the ends of said rim, and struck-in portions on the web of said felly for forming a shouldered engagement with said central enlargement, said felly being transversely slotted in the web portion thereof between said struck-in portions for the insertion of a tool into engagement with said enlarged portion of the rotary member.

10. In a wheel, the combination with a transversely split demountable rim, of means for circumferentially expanding and contracting said rim, comprising a rotary member extending across the split and having threaded end portions, nuts engaging said threaded end portions, straps for pivotally connecting said nuts to the opposite ends of the rim, a polygonal enlargement in the central portion of said rotary member, a felly formed of outwardly opening channel section provided with seats on its opposite flanges for receiving said rim, said felly being transversely slotted in the web portion thereof for the insertion of a tool into engagement with said polygonal portion and having inwardly bent portions on the opposite sides of said slot forming shoulders for engaging said enlarged polygonal portion.

11. In a wheel, the combination with a transversely split rim, of means engaging the inner side of said rim for circumferentially expanding and contracting the same, a member for bridging the split in said rim, and means secured to said member and engageable with the ends of the rim for automatically positioning said member with respect to said split when the rim is contracted.

12. In a wheel, the combination with a transversely split demountable rim, of means located on the inner side of said rim for circumferentially expanding and contracting the same, a member formed of light gage sheet metal for bridging the split in the rim, said member conforming with the cross-sectional contour of the rim, a lug or pin depending from said bridge and engaging corresponding notches in the ends of the rim, and forming a means for centralizing said bridge member when the rim is contracted.

13. In a wheel, the combination with a transversely split demountable rim, of means for circumferentially expanding and contracting said rim, comprising a straight rotary member having threaded end portions, nuts engaging said threaded end portions of an externally cylindrical form, the axes thereof transverse to the axis of said rotary member, straps embracing said nuts and flanged for securing to the opposite end portions of said rim, said straps being cut away for the passage of said rotary member therethrough and the outer flanges of said straps being notched to provide clearance for the outer portions of said rotary member.

14. In a wheel, the combination with a transversely split demountable rim, of means bridging the split for expanding and contracting said rim, and a hollow felly on which said rim is seated and within which the expanding and contracting means is located, said felly having struck-in portions on its web engageable with said expanding and contracting means for anchoring said rim to the felly.

In testimony whereof I affix my signature.

WILLIAM N. BOOTH.